(12) United States Patent
Escoffier

(10) Patent No.: US 12,728,547 B2
(45) Date of Patent: Sep. 8, 2026

(54) APPARATUS FOR SAMPLING OR GRIPPING BY MEANS OF A DEFORMABLE TOOL

(71) Applicant: ORANO DS—DÉMANTÈLEMENT ET SERVICES, Gif sur Yvette (FR)

(72) Inventor: Cédric Escoffier, Bagnols-sur-Ceze (FR)

(73) Assignee: ORANO DS—DÉMANTÈLEMENT ET SERVICES, Gif sur Yvette (FR)

( * ) Notice: Subject to any disclaimer, the term of this patent is extended or adjusted under 35 U.S.C. 154(b) by 1032 days.

(21) Appl. No.: 17/905,770

(22) PCT Filed: Mar. 11, 2021

(86) PCT No.: PCT/FR2021/050414

§ 371 (c)(1),
(2) Date: Sep. 7, 2022

(87) PCT Pub. No.: WO2021/181046

PCT Pub. Date: Sep. 16, 2021

(65) Prior Publication Data

US 2024/0208081 A1 Jun. 27, 2024

(30) Foreign Application Priority Data

Mar. 11, 2020 (FR) ....................................... 2002401

(51) Int. Cl.
*B25J 15/00* (2006.01)
*B25J 15/12* (2006.01)

(52) U.S. Cl.
CPC ........... *B25J 15/12* (2013.01); *B25J 15/0023* (2013.01)

(58) Field of Classification Search
CPC ........ B25J 15/02; B25J 15/12; B25J 15/0023; B25J 15/0616; B65G 47/91; B65G 47/905; B65G 47/908; E01H 1/1206
(Continued)

(56) References Cited

U.S. PATENT DOCUMENTS 3,981,528 A * 9/1976 Andorf ................ B25J 15/0023 92/92
6,846,029 B1 * 1/2005 Ragner ..................... B25B 9/00 294/219
(Continued)

FOREIGN PATENT DOCUMENTS

EP 1731452 A2 12/2006
JP 20000170712 A 6/2000
(Continued)

OTHER PUBLICATIONS

International Search Report for PCT/FR2021/050414 dated Jun. 17, 2021 and translation thereof.
(Continued)

*Primary Examiner* — Paul T Chin
(74) *Attorney, Agent, or Firm* — McDonald Hopkins LLC

(57) ABSTRACT

A flexible sleeve is mounted on a rigid support, the sleeve being lined with wafers distributed in rings around the sleeve. The sleeve can be retracted by an actuator so as to return the end face of the sleeve inside the sleeve, by making a fold which tilts the wafers inwards by forming surfaces for retaining taken objects or samples, which can be maintained between the wafers or inside chambers.

15 Claims, 6 Drawing Sheets

(58) Field of Classification Search
USPC .................................................. 294/99.1, 208
See application file for complete search history.

(56) References Cited

U.S. PATENT DOCUMENTS

| | | | | |
|---|---|---|---|---|
| 7,726,716 | B2 * | 6/2010 | Shuttleworth ........ | E01H 1/1206 294/86.4 |
| 9,623,570 | B1 | 4/2017 | Krahn et al. | |
| 10,086,519 | B2 * | 10/2018 | Wagner .................. | B65G 47/91 |
| 11,865,702 | B2 * | 1/2024 | Onal ...................... | B25J 9/0015 |
| 2017/0072572 | A1 | 3/2017 | Wagner et al. | |
| 2020/0215701 | A1 * | 7/2020 | Takahashi ................ | B25J 15/12 |

FOREIGN PATENT DOCUMENTS

| | | | |
|---|---|---|---|
| JP | 20050069251 | A | 3/2005 |
| WO | 2016146140 | A1 | 9/2016 |
| WO | 2020160561 | A1 | 8/2020 |

OTHER PUBLICATIONS

Written Opinion for PCT/FR2021/050414 dated Jun. 17, 2021.
Search Report for French application No. Fr2002401 dated Nov. 27, 2020.

* cited by examiner

APPARATUS FOR SAMPLING OR GRIPPING BY MEANS OF A DEFORMABLE TOOL

CROSS-REFERENCE TO RELATED APPLICATIONS

This is a National Stage of PCT international application PCT/FR2021/050414, filed on Mar. 11, 2021, which claims the priority of French Patent Application No. FR2002401, filed Mar. 11, 2020, both of which are incorporated herein by reference in their entirety.

The present invention relates to an apparatus for sampling or gripping by means of a deformable tool.

The existing sampling and gripping tools are of many and varied kinds; they are most often based either on grasping by a solid tool, or by suction against a surface of the apparatus. Such apparatuses are often satisfactory, but they generally have the drawback of being limited to only certain types of products to be sampled. Another of their drawbacks is that such apparatuses must be made considerably more complex if the grasping is to be made safe. On the contrary, the invention aims at being able to take objects or samples which are very varied, for example friable, having a very irregular surface or even liquid, with a great reliability and a simple construction of the apparatus.

The related prior art comprises the document WO 2016/146 140 A1, which describes a gripping and grasping apparatus with a tool composed of a deformable membrane under the action of a jack, and which grips small objects in a fold of the membrane formed thanks to the retraction of the jack. This device is bulky.

Another document is EP 1 731 452 A2, which describes an apparatus to which the preceding remarks apply.

In a general form, the invention relates to a sampling or gripping apparatus, comprising a support having a lateral wall and a rear face and a tool mounted on the support, the tool being deformable and comprising a sleeve having a lateral wall, and an end face and an edge between which the lateral wall of the tool extends, the edge being fastened to the support and the end face extending away from the support in a deployed state of the sleeve where the lateral wall of the support, the lateral wall of the sleeve, the rear face and the end face enclose an internal volume, and the apparatus further comprising a sleeve retraction actuator returning the end face into the internal volume and folding the lateral wall of the sleeve to a folded state, characterised in that the tool further comprises at least one ring of wafers which are attached to the sleeve and radiating around the sleeve in the deployed state, the at least one ring of wafers is surrounded by the lateral wall of the sleeve in the folded state, and the apparatus further comprises means for guiding the retraction of the sleeve by the retraction actuator, extending in the internal volume from the end face of the tool to the rear face of the support.

The support is advantageously a sheath in which the sleeve is contained in the folded state.

The sleeve can be tapered tapering towards the end face, which facilitates its folding.

In a particular embodiment, the internal volume contains a bellows delimiting a chamber and guiding the retraction of the sleeve by the retraction actuator, and which constitutes the guide means.

In a particular embodiment of the invention, the internal volume and/or the chamber is a hermetic volume and the retraction actuator is means for sucking the hermetic volume.

According to another variant, the retraction actuator is a jack whose rod is fastened to the end face.

The sleeve filled with wafers which characterises the invention is capable of being closed on an object or a sample to be sampled or gripped, after having been placed thereon, by retracting the sleeve; the wafers approach each other by tilting over themselves when the fold of the sleeve reaches their level, their ring is closing inside the tool, thus delimiting a compartment containing the object or the sample inside the support in the final state.

It is advantageous that the wafers are flexible, in order to facilitate taking the gripped objects and to avoid damaging them. It is still advantageous, in this case of flexible wafers, that they form with the sleeve a unitary moulded structure.

The sleeve, with the wafers if necessary, can be for example made of silicone or polyurethane; the sleeve can also include a main material such as these, and a sheet reinforcing the main material, made of Kevlar for example.

The ring, or each ring, of wafers is also advantageously continuous and sealed in the folded state. It can then retain a sample which can be liquid in a compartment that it delimits with other portions of the apparatus.

Grasping or gripping objects can also be improved if the wafers are lined with means facilitating taking the objects. This can be, for example, magnets to facilitate taking magnetic objects or a rough surface improving the frictional engagement.

In another possibility of construction, the wafers are hollow with one face facing the end face in the deployed state, in order to be able to easily collect liquid samples.

An important aspect of the invention is however that the retraction of the flexible sleeve from the deployed state is made by a means called guide means which is itself retractable, connected, at the opposite ends thereof, to the rear face of the support and to the end face of the sleeve. Such retractable guide means have the property of occupying little volume in the folded state and of remaining against the rear face of the support in all circumstances, which reduces the volume of the apparatus relative to sliding guide means such as jack rods or pistons.

In certain particularly appreciated embodiments, where the support is in the form of a sheath, the guide means remains contained in the sheath and protected thereby in all circumstances, and the sleeve is also contained in the sheath in the folded state, with the same benefit. It is then particularly appreciated that the actuator is suction means, which can advantageously be connected to the rear face of the support by a flexible conduit for sucking the internal volume delimited by the sleeve and the support, or for sucking the hermetic chamber delimited by the bellows or a comparable guide means, when this chamber is present: the suction produces the retraction of the sleeve and the guide means in both cases. A particularly handy apparatus is provided, because the tool can be displaced independently of the suction means, possibly by hand if the support is (for example) a portable sheath.

Among the guide means which can be used and which are particularly appreciated, mention should also be made of the mechanisms called telescopic mechanisms, composed of sections sliding on or in each other. Such mechanisms have a good rigidity, in particular towards accidental deflections of the sleeve in the lateral direction.

The deployments and the foldings of the telescopic mechanism can be limited only by stop mechanisms established between neighbouring sections, therefore with a great simplicity.

According to some aspects of these embodiments:

the sections are concentric tubes, an outer tube of which forms the sheath by being fastened to the rear face of the support, and an inner tube of which is fastened to the end face of the tool;

said sections are provided with stops limiting deployments of said sections relative to neighbouring sections;

the sections comprise locks for stopping the deployments or the foldings of said sections relative to neighbouring sections;

the locks each comprise a bore passing through a wall of a first of the sections, a movable element in the bore and having a dimension, in a direction of length of the bore, which is greater than the length of the bore, and cavities dug into a second and a third of the sections, the cavities separately coming in front of opposite ends of the bore during movements, and each having faces which are inclined so as to push the element into the bore.

The different aspects, features and advantages of the invention will now be described by means of the following figures, which illustrate certain embodiments given for purely illustrative purposes:

FIG. 1 is a general view of the apparatus;

FIG. 2 a section of FIG. 1;

FIG. 3 a front view of the tool;

Figure 10:
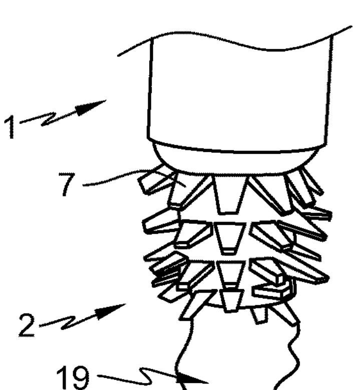
Figure 11:
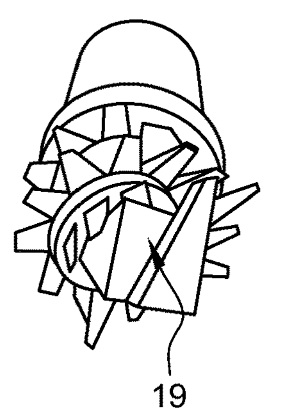
Figure 12:
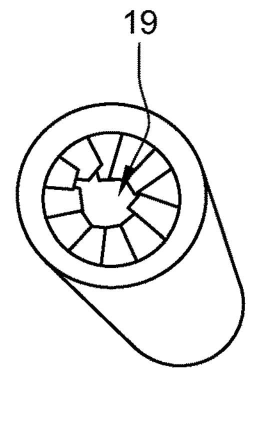
Figure 13:
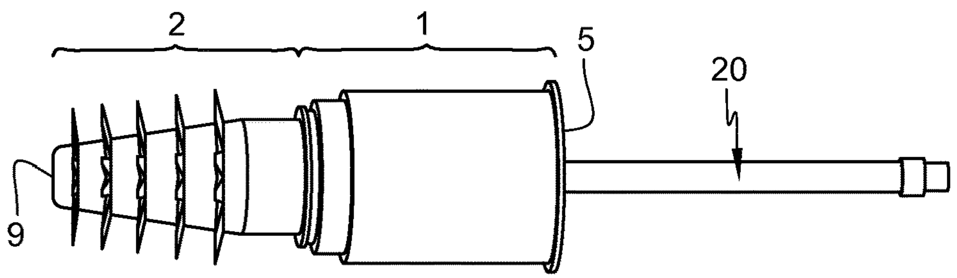
Figure 14:
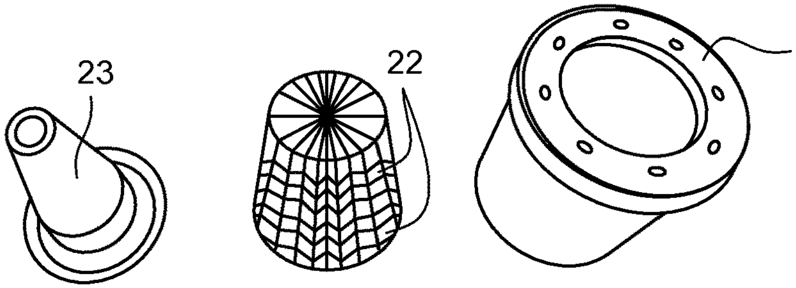
Figure 15:
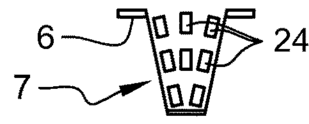
Figure 16:
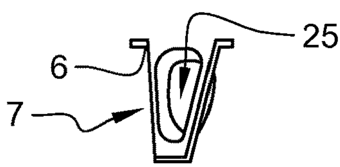
Figure 17:
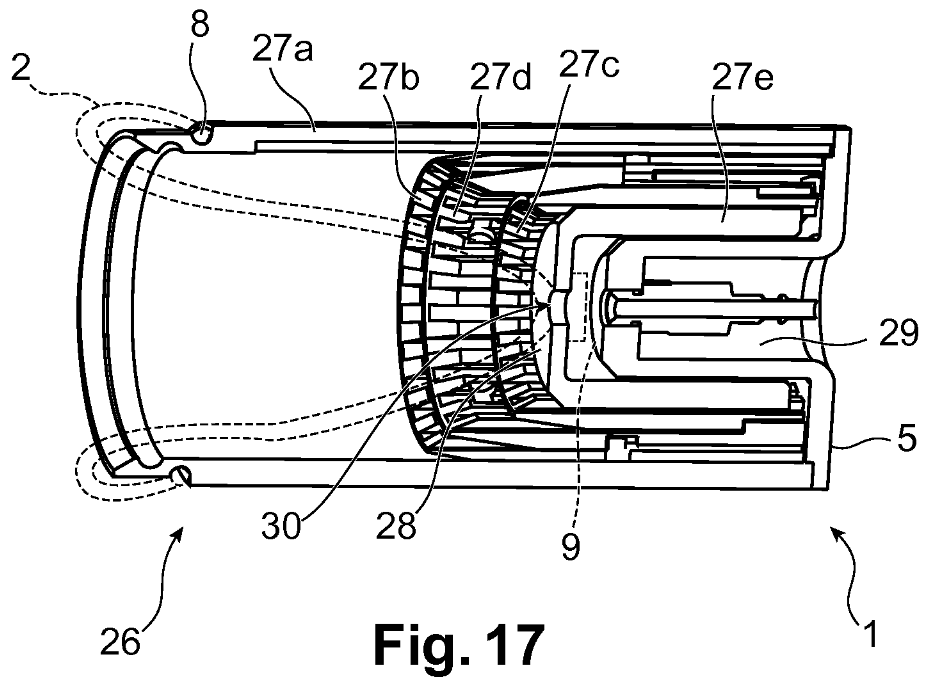
Figure 18:
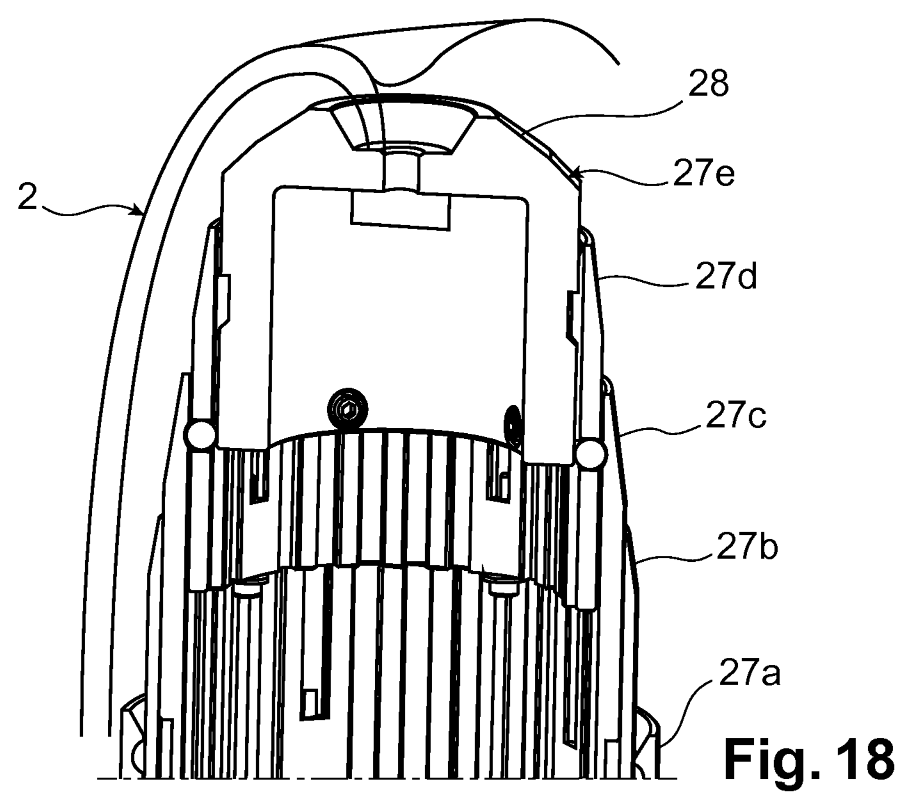
Figure 19:
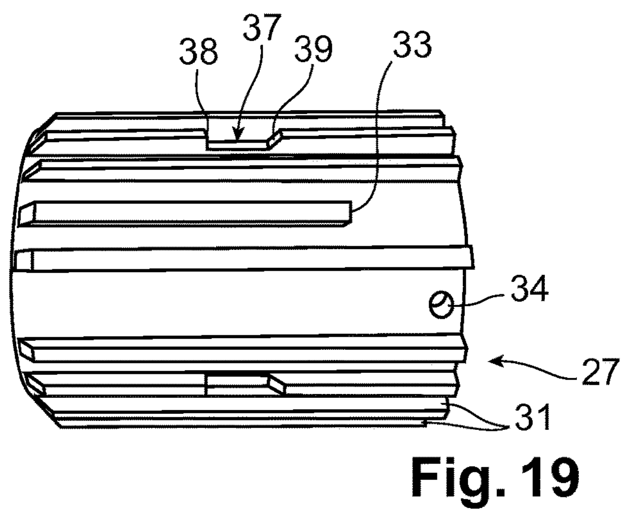
Figure 20:
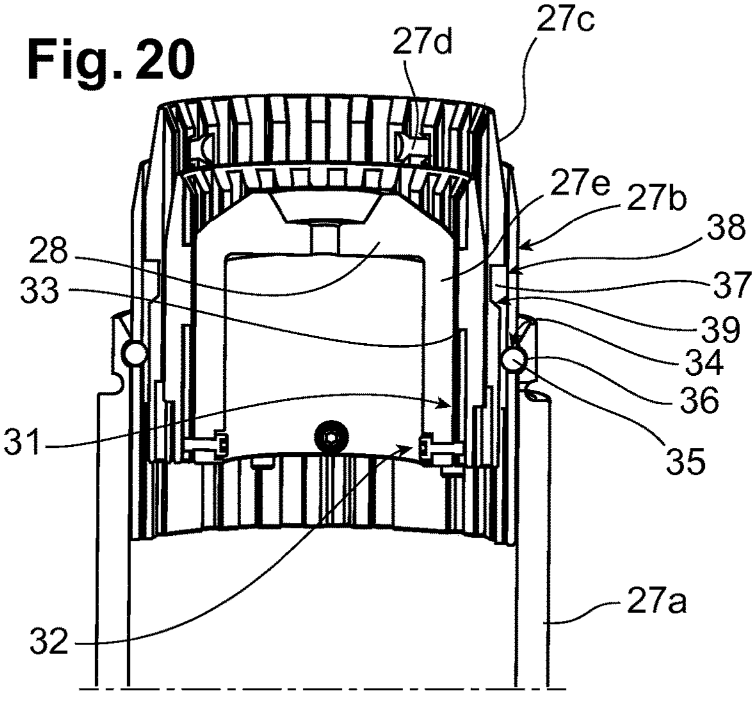
Figure 21:
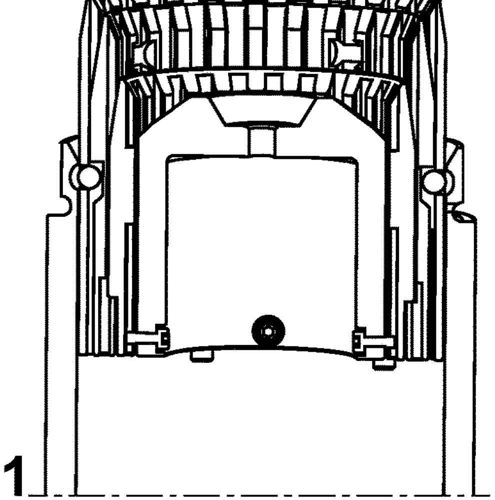

FIG. 10 perspective view of the sleeve in the deployed state, preliminary to a gripping;

FIG. 11 the sleeve in perspective in a partially folded state, having gripped the object;

FIG. 12 the folded sleeve having gripped the object;

FIG. 13 another embodiment of the invention;

FIG. 14 of the moulding parts of an embodiment of the sleeve;

FIG. 15 a particular embodiment of wafers;

FIG. 16 another particular embodiment of wafers;

FIG. 17 representation of a telescopic mechanism for controlling the deployment of the sleeve in a retracted state;

FIG. 18 this mechanism in the fully extended state;

FIG. 19 view of one of the sections of the mechanism;

FIG. 20 a moment of the folding process of the mechanism;

FIG. 21 an immediately following moment.

Figure 1:
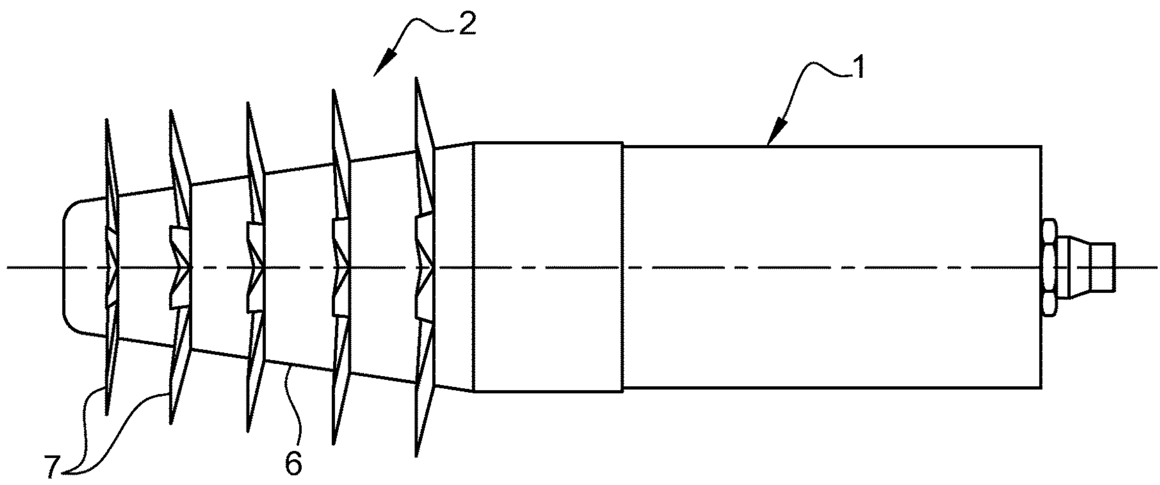
Figure 2:
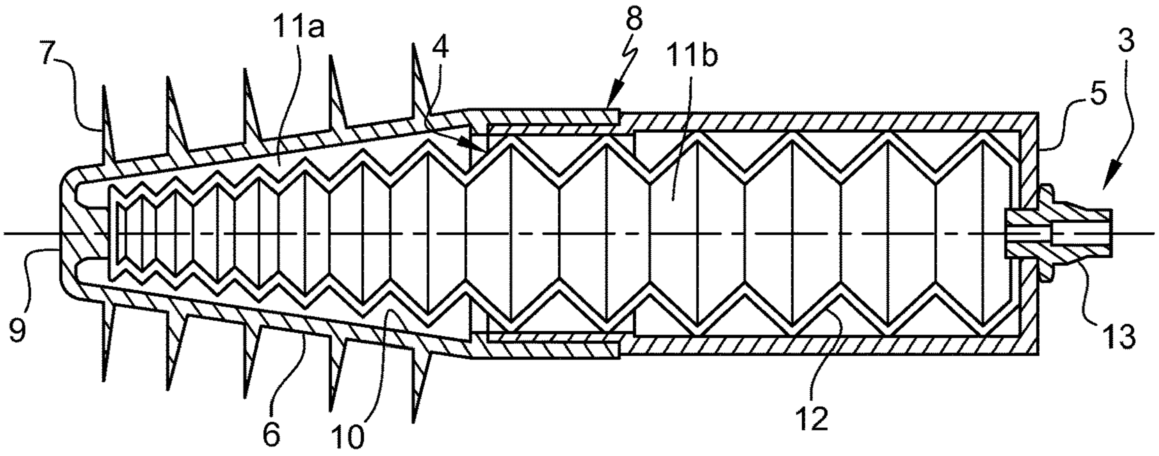
Figure 3:
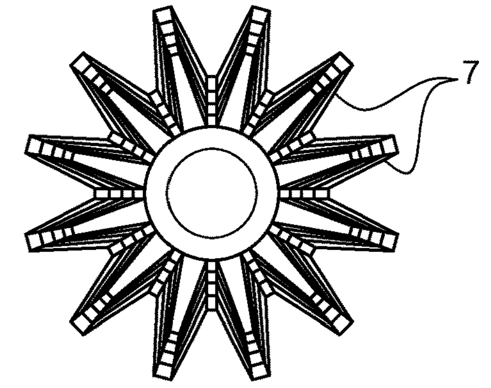

The description first relates to FIGS. 1, 2 and 3. The embodiment of the apparatus represented therein consists mainly of a support 1, a tool 2 and an actuator 3. The support 1 is a rigid part, herein in the form of a cylindrical sheath open at a front end 4 and closed at a rear end 5 by a plate. The tool 2 is made of a flexible material, possibly elastic, and it consists of a sleeve 6 and wafers 7. The sleeve 6 has a rear end 8 crimped at the front end 4 of the support 1. The sleeve 6 is mainly consisting of a tapered lateral wall tapering from the rear end 8 open to a front end, which is closed by an end face 9. Throughout this description, “front” and “rear” are considered in a direction of movement of the actuator of the tool 2, which is deployed forward and folded or retracted rearwards. The apparatus is roughly axisymmetric about this direction, which can therefore also help describing it conveniently, the tool 2 being in front of the support 1 and the actuator 3.

The wafers 7 are distributed in groups forming rings superimposed on the height of the sleeve 6, about the axis of the cone, and these rings are herein five in number, without their number being critical.

FIG. 3 shows that the wafers 7 have a trapezoidal shape narrowing outwards. They are advantageously flexible, just like the sleeve 6, and they are also advantageously constructed in one piece therewith, and therefore of the same base material. It is however possible to reinforce the sleeve, if it is for example deemed too flexible, by a reinforcement sheet 10 which can be disposed on the inner wall thereof. Base materials suitable for the manufacture of the sleeve 6 and possibly the wafers 7 are silicone, polyurethane, and when it exists, the reinforcing sheet 10 can be made of Kevlar (registered trademark).

The support 1 and the sleeve 2, in the deployed state which is represented in FIGS. 1 to 3, enclose an internal volume 11*a* which extends from the end face 9 to the rear face 5. The actuator 3 is herein consisting of a suction outlet 13 established at the rear face 5 and opening into the internal volume 11*a*.

In a preferred embodiment with reference to FIG. 2, the internal volume 11*a* comprises a bellows 12 which is fastened to the end face 9 and to the rear face 5 by the ends thereof, whose internal volume forms the chamber 11*b*. The suction outlet 13 then opens into the chamber 11*b*.

Figure 4:
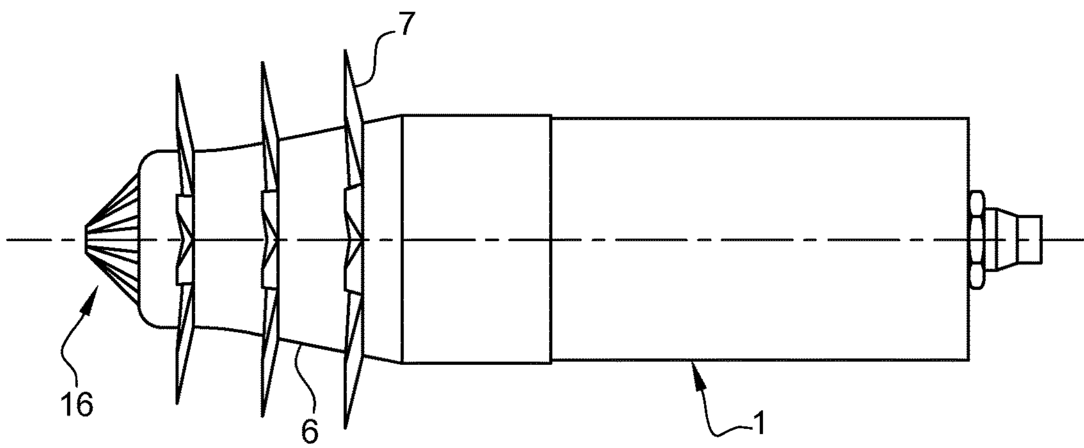
FIG. 4 is homologous to FIG. 1, in a partially folded state of the sleeve.
Figure 5:
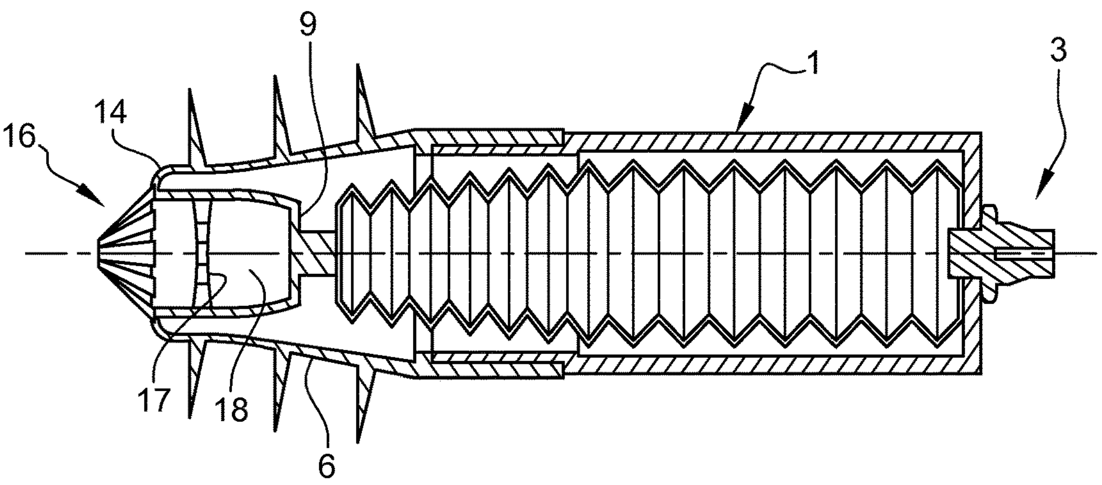
FIG. 5 is homologous to FIG. 2, in the partially folded state.
Figure 6:
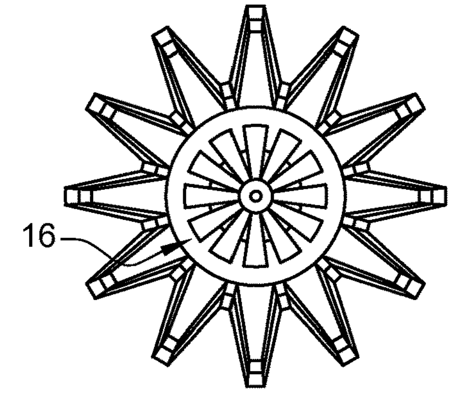
FIG. 6 is homologous to FIG. 3, in the partially folded state.
Figure 7:
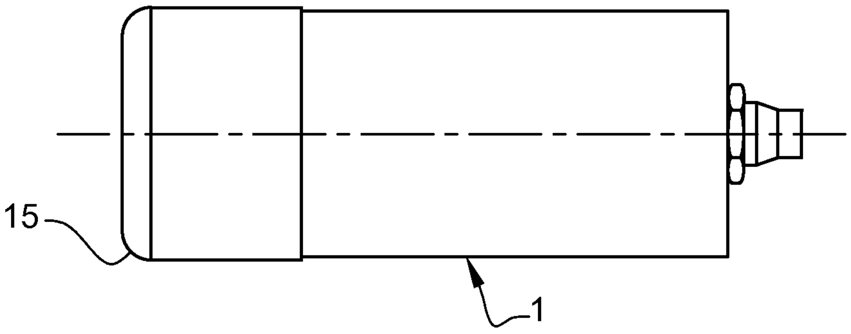
FIG. 7 is homologous to FIG. 1, in a fully folded state of the sleeve.
Figure 8:
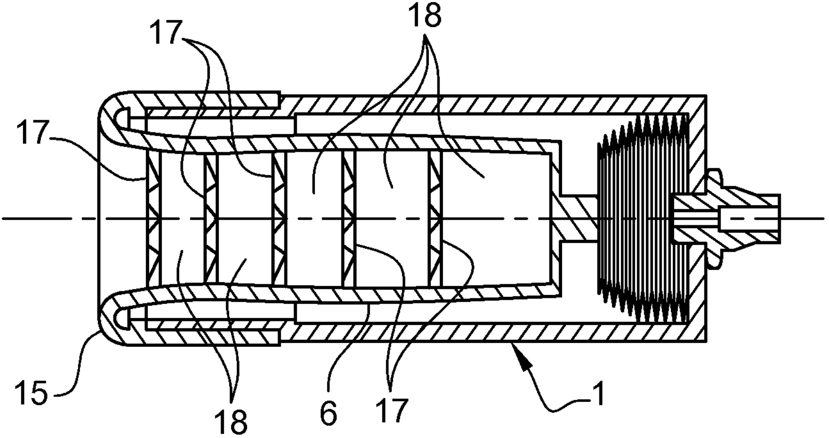
FIG. 8 is homologous to FIG. 2, in the fully folded state.
Figure 9:
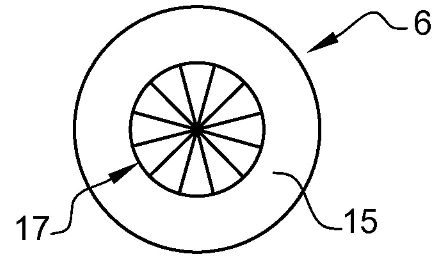
FIG. 9 is homologous to FIG. 3, in the fully folded state.

FIGS. 4 to 6 illustrate the apparatus in a partially retracted state of the tool 2, and FIGS. 7 to 9, the apparatus in a fully retracted state. This is accomplished by sucking the volume of the chamber 11*b* through a device, which is not represented, coupled to the suction outlet 13. The end face 9 sinks into the sleeve 6 and gradually drives the anterior portion of the sleeve 6 by forming a fold (14 in FIG. 5, 15 in FIG. 8) on the sleeve 6. When the fold 14 reaches the rings of wafers 7, said rings of wafers tilt and are closed little by little, until the ends thereof become adjacent (this is represented for the ring 16 in FIGS. 4 to 6), then, the rings of wafers 7 continuing to be closed, the wafers 7 thereof become contiguous, or even overlap by forming a planar surface which is possibly continuous and sealed opposite from the outside (this is the case of the rings 17 of FIGS. 5, 8 and 9), and which partitions the inside of the folded portion of the sleeve 6 by forming hermetic compartments 18. In the represented embodiment, the sleeve 6 is almost completely housed in the internal volume of the support 1 and protected by the latter in the fully folded state.

When an object 19 should be gripped (FIG. 10), the apparatus with the sleeve 2 in the deployed state is approached thereto, and the volume of the chamber 11*b* is gradually sucked while maintaining a slight pressure of the sleeve 6 on the object 19. The rings of wafers 7 are closed little by little on the object 19 (FIG. 11, which represents the apparatus approximately in the state of FIGS. 4 to 6), and the object 19 is gradually brought inside the support 1 as the sleeve 6 folds (FIG. 12). It is then naturally retained therein.

The apparatus, illustrated herein for gripping a solid object 19, could just as well be used to take a sample of a powdery, liquid or other product, in the embodiments where the closing wafers 7 hermetically delimit the compartments 18.

Other embodiments of the invention are obviously possible. This is how the suction means constituting the retraction actuator could be replaced by a jack 20 (FIG. 13), one movable end of which is also fastened to the end face 9, and which extends behind the apparatus by passing through the rear face 5. The bellows can advantageously be kept in association with the jack since it allows guiding the retraction of the sleeve.

The tool 2 can be manufactured by moulding. An example of a moulding assembly is represented in FIG. 14 and comprises an outer cylinder 21, a group of moulding sectors 22 and a central core 23. The wafers 7 are moulded in notches of corresponding shapes of the moulding sectors 22, and the sleeve 6 is moulded in an interval which remains between the moulding sectors 22 and the central core 23 when they have all been placed in the cylinder 21. The manufacture of the moulding sectors 22 and of the central core 23 can be performed by a three-dimensional printing or by moulding from counter-moulds.

The wafers 7 can be improved to promote the grasping or hooking of certain categories of objects or products. They can for example (FIG. 15) be provided with permanent magnets 24, or have (FIG. 16) the face thereof oriented towards the end 9 provided with a concavity 25 which allows the sampling of a liquid product.

FIG. 17 and subsequent figures are intended to describe a particularly preferred embodiment of the invention. It is based on the use of a telescopic mechanism 26 to control the deployments and foldings of the sleeve 6. The opposite ends thereof are fastened respectively to the rear face 5 of the support 1 and to the end face 9 of the sleeve 6. It consists of tubes 27 which are concentric and sliding into each other in the direction of deployment of the sleeve 6. The tubes 27 are herein five in number and denoted 27*a* to 27*e* from their largest radius to their smallest radius. The outer tube 27*a* is fixed and is actually part of the support 1; it is this which, fastened to the rear face 5 by the rear end thereof, forms the sheath. The following three tubes 27*b*, 27*c* and 27*d* are intermediate tubes each composed of a cylindrical wall like the outer tube 27*a*; and the inner tube 27*e* is composed of a cylindrical wall and a front face 28 at the front, to which the front end 9 of the sleeve 6 is fastened. The tubes 27*b* to 27*e* are movable relative to the support 1. The tubes 27*a* to 27*e* successively protrude out of each other forwards in the deployed state (FIG. 18), and they are contained within each other in the folded state (FIG. 17), where they touch, or almost touch, the rear face 5 of the support 1. A suction nozzle 29, which retains the end of a suction conduit which is not represented, can then extend into the hollow of the 27th inner tube. As in the previous embodiment, the retraction of the sleeve 6, at the same time as that of the telescopic mechanism 26, is done by sucking the gaseous content from the internal volume 11*a* through a bore 30 of the nozzle 29. Like the outer tube 27*a* forming the sheath of the support 1 is much longer than the others, a large folding length inside the sheath is offered to the sleeve 6 in the folded state.

The cylindrical walls of the tubes 27 are provided (FIG. 19) first with splines 31 oriented in the direction of retraction, and in some of which pins 32 slide (herein formed by screws shown in FIG. 20) of the neighbouring tube 27, in order to maintain the tubes 27 at invariable angular positions. The corresponding splines 31 have a stop face 33 at the front end thereof, in order to stop the corresponding pin 32 and the deployment of the tube 27 which carries it.

A significant locking system is proposed in order to guarantee a stepped and progressive folding of the telescopic mechanism 26; its operation will be better understood by means of FIGS. 20 and 21. Each of the intermediate tubes 27*b*, 27*c* and 27*d* is provided with a radial bore 34 which passes through the entire thickness of the cylindrical wall thereof, and which contains a locking part such as a ball 35 which is radially movable therein and has a diameter which is greater than the thickness of the cylindrical wall. The outer neighbouring tube 27 (27*a*, 27*b* or 27*c*) is dug with a cavity 36 in the portion of a sphere into which the ball 35 can penetrate when it arrives in front of this cavity 36. In addition, the inner neighbouring tube 27 (27*c*, 27*d* or 27*e*) includes a cavity 37 in a short groove limited at the front by a straight face 38 (perpendicular to the direction of retraction) and at the rear by a bevelled face 39 (oblique, rearwardly inclined in the radially outer direction). In the deployed state, the balls 35 extend both into the bores 34 and the cavities 36, where they are held by the immediately inner tubes 27, while the cavities 37 in short grooves are significantly forward. When the retraction begins, the inner tube 27*e* first moves backwards alone, until the cavity 37 thereof in a short groove arrives in front of the ball 35 housed in the immediately neighbouring tube 27*d*. The ball 35 passes into the cavity 37 in a short groove by sliding out of the cavity 36, which releases the tube 27*d* from the immediately outer tube 27*c* and allows it to move back with the inner tube 27*e*, and keep it therewith, as soon as that the ball 35 has touched the straight face 38. The ball 35 is held in the cavity 37 in a short groove as soon as it has descended below the cavity 36. The process is then successively repeated for each of the locking systems. The balls 35 are all in the cavities 37 in short grooves in the fully folded state of the telescopic mechanism 26 and the sleeve 6, and they are all in the cavities 36 in their fully deployed state. The folding movements always begin with the inner tube 27*e*, whose front face 28 undergoes the differential pressures produced by the suction device. The deployment of the telescopic system 26 is kinematically identical in the opposite direction, that is to say that the inner tube 27*e* first drives all intermediate tubes 27*b* to 27*d*, until the balls 35 successively enter the cavities 36 of the immediately outer tubes 27*a* to 27*c*, by being pushed therein by the bevelled faces 39: the tubes 27*b*, 27*c*, 27*d* and 27*e* then stop.

This telescopic mechanism therefore offers an ordered operation, a great stability in the deployment and folding states, and a certain rigidity against accidental lateral deflections of the sleeve 6 in the deployed state. The structure thereof is simple and robust. It can be actuated other than by gas pressures, despite the advantages offered by this means.

What is claimed is:

1. A sampling or gripping apparatus, comprising:

a support having a lateral wall and a rear face and a tool mounted on the support, wherein the tool is deformable and wherein the tool comprises a sleeve having a lateral wall, and an end face and an edge between which the lateral wall of the tool extends, wherein the edge is fastened to the support and the end face extends away from the support in a deployed state of the sleeve where the lateral wall of the support, the lateral wall of the sleeve, the rear face and the end face enclose an internal volume extending from the end face to the rear face, and the apparatus further comprising:

a sleeve retraction actuator returning the end face into the internal volume and folding the lateral wall of the sleeve to a folded state, wherein the tool further comprises at least one ring of wafers which are attached to the sleeve and wherein the wafers are radiating around the sleeve in the deployed state, wherein the at least one ring of wafers is surrounded by the lateral wall of the sleeve in the folded state, and wherein the apparatus further comprises a retractable means for guiding the retraction of the sleeve by the retraction actuator, wherein the retractable means extends in the internal volume by being connected, at the opposite ends thereof, to the rear face of the support and to the end face of the sleeve.

2. The sampling or gripping apparatus according to claim 1, wherein the support is a sheath in which the sleeve is contained in the folded state, and wherein the rear face is a plate closing the sheath at a rear end of the sheath.

3. The sampling apparatus according to claim 2, wherein the retractable means is a telescopic mechanism, composed of sections sliding on or in each other, and wherein the sections are concentric tubes, an outer tube of which forms the sheath by being fastened to the rear face of the support, and an inner tube of which is fastened to the end face of the tool.

4. The sampling apparatus according to claim 3, wherein the sections of the telescopic mechanism is provided with stops limiting deployments of said sections relative to neighbouring sections.

5. The sampling apparatus according to claim 3, wherein the sections comprise locks for stopping the deployments or the foldings of said sections relative to neighbouring sections.

6. The sampling apparatus according to claim 5, wherein the locks each comprise:

a bore passing through a wall of a first of the sections, a movable element in the bore and having a dimension, in a direction of length of the bore, which is greater than the length of the bore, and cavities dug into a second and a third of the sections, the cavities separately coming in front of opposite ends of the bore during movements, and each having faces which are inclined so as to push the element into the bore.

7. The sampling or gripping apparatus according to claim 1, wherein the retractable means is a bellows delimiting a chamber which is included in the internal volume.

8. The sampling or gripping apparatus according to claim 7, wherein the chamber is hermetic, and wherein the retraction actuator is a means for sucking the chamber.

9. The sampling or gripping apparatus according to claim 1, wherein the internal volume is hermetic, and the retraction actuator is means for sucking the internal volume.

10. The sampling or gripping apparatus according to claim 1, wherein the sleeve includes a main material and a sheet for reinforcing the main material.

11. The sampling or gripping apparatus according to claim 1, wherein the at least one ring of wafers is continuous and sealed in the folded state.

12. The sampling or gripping apparatus according to claim 1, wherein the wafers carry means which promote the grasping or hooking of the objects to be sampled or gripped.

13. The sampling or gripping apparatus according to claim 12, wherein the wafers carry means are permanent magnets.

14. The sampling or gripping apparatus according to claim 12, wherein the wafers carry means are concavities on the face oriented toward the end face of the sleeve.

15. The sampling or gripping apparatus according to claim 1, wherein the wafers are hollow with one face facing the end face in the deployed state.

* * * * *